(12) United States Patent
Kwak et al.

(10) Patent No.: US 9,948,553 B2
(45) Date of Patent: Apr. 17, 2018

(54) SYSTEM AND METHOD FOR VIRTUAL NETWORK-BASED DISTRIBUTED MULTI-DOMAIN ROUTING CONTROL

(71) Applicant: ELECTRONICS AND TELECOMMUNICATIONS RESEARCH INSTITUTE, Daejeon-si (KR)

(72) Inventors: Ji Young Kwak, Gwangju-si (KR); Yong Yoon Shin, Daejeon-si (KR); Sae Hoon Kang, Daejeon-si (KR); Byung Yun Lee, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 98 days.

(21) Appl. No.: 14/923,641

(22) Filed: Oct. 27, 2015

(65) Prior Publication Data

US 2016/0134527 A1 May 12, 2016

(30) Foreign Application Priority Data

Nov. 11, 2014 (KR) .......................... 10-2014-0156284

(51) Int. Cl.
*H04L 12/713* (2013.01)
*H04L 12/751* (2013.01)
*H04L 12/715* (2013.01)

(52) U.S. Cl.
CPC ............ *H04L 45/586* (2013.01); *H04L 45/02* (2013.01); *H04L 45/04* (2013.01); *Y02B 60/43* (2013.01)

(58) Field of Classification Search
CPC ........ H04L 45/586; H04L 45/04; H04L 45/02
See application file for complete search history.

(56) References Cited

U.S. PATENT DOCUMENTS

| | | | |
|---|---|---|---|
| 7,583,683 B2 | 9/2009 | Kim | |
| 2012/0226733 A1 | 9/2012 | Kim et al. | |
| 2013/0058346 A1 | 3/2013 | Sridharan et al. | |
| 2013/0060929 A1* | 3/2013 | Koponen | ............ H04L 12/4633 709/224 |
| 2013/0212241 A1 | 8/2013 | Kang et al. | |

(Continued)

FOREIGN PATENT DOCUMENTS

KR     10-2004-0052921 A     6/2004

*Primary Examiner* — Khaled Kassim
*Assistant Examiner* — Syed S Ali
(74) *Attorney, Agent, or Firm* — LRK Patent Law Firm

(57) ABSTRACT

A system for distributed multi-domain routing control includes two or more software-defined network (SDN) controllers and virtual routers. The two or more SDN controllers create virtual topology information by collecting information about switches under the control thereof, exchange network information about a different virtual network, as well as create a routing path from a source terminal to a destination cross switch or a routing path from the destination cross switch to a destination terminal based on location identification information of the destination terminal and/or the virtual topology information. Then, the virtual routers manage communication between the different virtual tenant networks or communication between each virtual tenant network and an external network.

14 Claims, 5 Drawing Sheets

(56) References Cited

U.S. PATENT DOCUMENTS

| | | | |
|---|---|---|---|
| 2014/0301192 A1* | 10/2014 | Lee | H04L 47/10 |
| | | | 370/230 |
| 2015/0110107 A1* | 4/2015 | Ishizuka | H04L 45/16 |
| | | | 370/389 |
| 2015/0131997 A1* | 5/2015 | Syed | H04Q 11/0066 |
| | | | 398/69 |
| 2015/0188808 A1* | 7/2015 | Ghanwani | H04L 41/12 |
| | | | 709/244 |
| 2015/0334001 A1* | 11/2015 | Sato | H04L 12/6418 |
| | | | 370/392 |
| 2016/0112301 A1* | 4/2016 | Shimada | H04L 12/6418 |
| | | | 370/390 |
| 2016/0197824 A1* | 7/2016 | Lin | H04L 45/38 |
| | | | 370/389 |

* cited by examiner

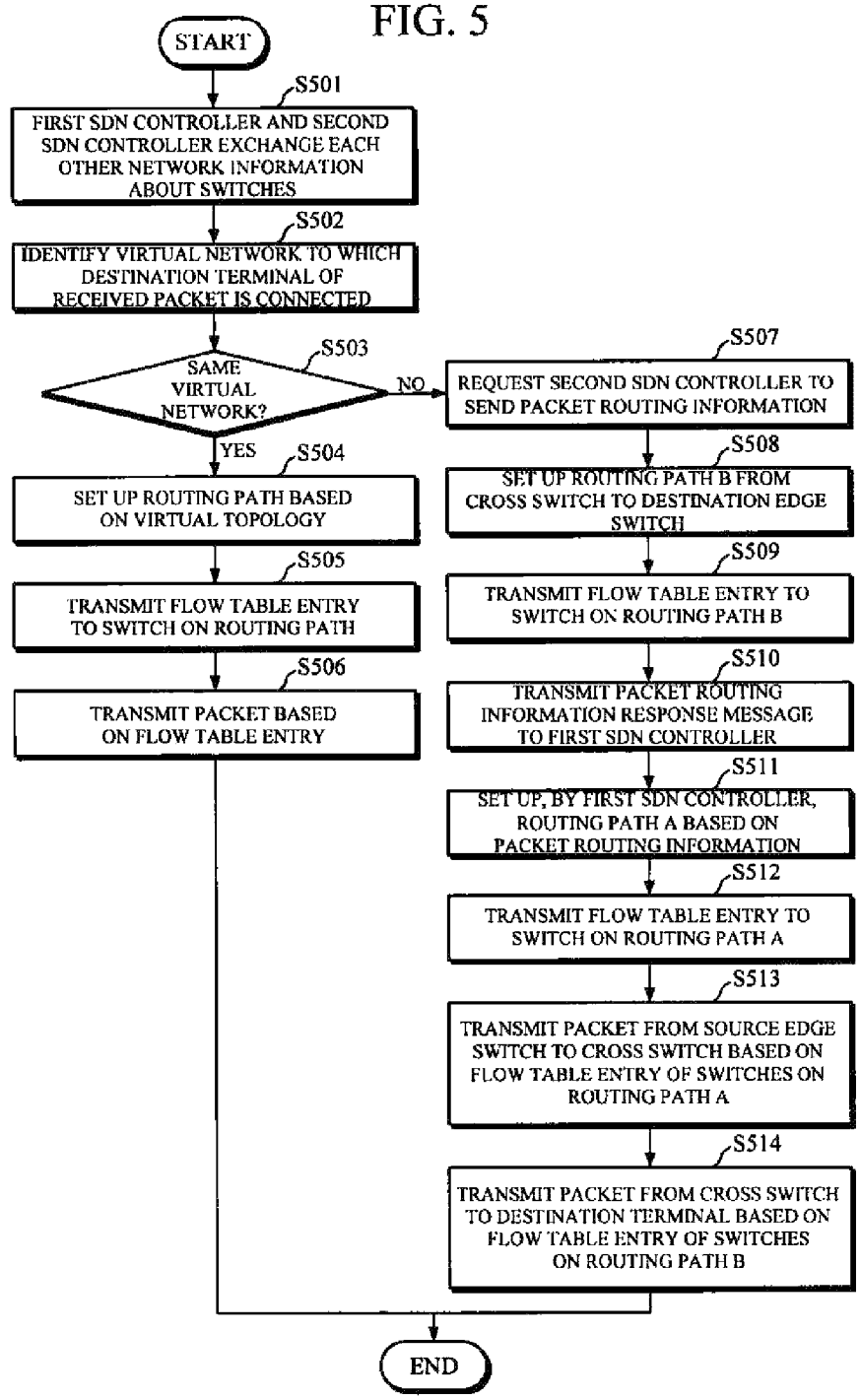

SYSTEM AND METHOD FOR VIRTUAL NETWORK-BASED DISTRIBUTED MULTI-DOMAIN ROUTING CONTROL

CROSS-REFERENCE TO RELATED APPLICATION(S)

This application claims priority from Korean Patent Application No. 10-2014-0156284, filed on Nov. 11, 2014, in the Korean Intellectual Property Office, the disclosure of which is incorporated herein by reference in its entirety.

BACKGROUND

1. Field

The following description relates to a virtual network, and more specifically, to routing control for a software-defined networking (SDN).

2. Description of the Related Art

A programming methodology that has developed and matured in the computer industry is expanding into the area of networking. In light of this, software-defined networking (SDN) has emerged as a new networking paradigm that can provide flexibility of network configurations. SDN is a next-generation networking technology that enables the control of networks via software programming, enabling networks to be programmable by a network administrator unlike in the existing closed network environment, and thereby allowing for more convenient handling of network control and management. Specifically, SDN is gaining in popularity as a technology that can fundamentally solve high cost and complexity in construction, operation, management of existing networks. In SDN, network equipment is divided into the control plane and data transmission plane, which are connected via open interfaces. The control plane is controlled by a centralized controller, controlling the data transmission plane via programming. Current SDN is in the initial stage of research and development and has been applied to small scale networks, such as a data center network on a campus network, which have no compatibility issues with external networks. Also, various researches have been conducted regarding the application of SDN to large scale networks, such as the network of Internet service provider (ISP), to improve the efficiency of network operation/management.

Scalability is the most important issue in the construction of large scale SDN. Initially, SDN was designed to simplify the existing network control structure, providing a single centralized controller to control the entire network. However, as the scale of a network increases, there are more switches to be controlled and, in turn, the amount of control traffic generated by the switches increases. So as the control traffic concentrates on the controller and load on the controller increases, it becomes impossible to control the entire network using only one controller. In addition, as the distance from switches to the controller increases, the switches' flow processing speed may decrease. Also, if flow processing traffic occurs beyond the hardware capacity of the controller, the overall network control may not be properly carried out.

U.S. Patent Application Publication No. US 2012/0226733 discloses that a cloud computing system and method for distributing and controlling traffic in the cloud computing system, wherein the cloud computing system includes a plurality of local data centers and a control center coupled to the plurality of local data centers. The above US patent application only relates to a method for distributing traffic when an amount of traffic to the local data center exceeds a given threshold, and does not disclose the distribution of load from control traffic of virtual networks.

SUMMARY

The following description relates to a system and method for distributed multi-domain routing control, which can provide the scalability of network control in the construction of a large-scale software-defined network, distribute traffic load that is caused by centralized network control, and provide efficient routing between domains without affecting traffic of another virtual network service.

In one general aspect, there is provided a system for distributed multi-domain routing control in different virtual tenant networks formed as software-defined networks (SDN), the system including SDN controllers and a virtual router. The SDN controllers include a first SDN controller and a second SDN controller. The first SDN controller is configured to create virtual topology information by collecting information about switches under control thereof, and create a first routing path from a source terminal that has sent a packet to a destination cross switch of a virtual tenant network to which a destination terminal of the packet is connected, based on received location identification information of the destination terminal and the created virtual topology information. The second SDN controller is configured to create virtual topology information by collecting information about switches under control thereof, transmit the location identification information of the destination terminal in response to a request from the first SDN controller, and create a second routing path from the destination cross switch to the destination terminal based on the created virtual topology information. The virtual router is configured to manage communications between the different virtual tenant networks or between each of the virtual tenant networks and an external network.

Each of the first SDN controller and the second SDN controller may include: a virtual network flow (VNF) router configured to exchange network information about the different virtual tenant network, identify, based on the exchanged network information, a virtual tenant network to which the destination terminal of the received packet is connected, and manage a communication within the virtual tenant network; and a VNF controller configured to request the virtual tenant network to which the destination terminal is connected to send packet routing information that contains the location identification information of the destination terminal, reply to the packet routing information request by sending the location identification information of the destination terminal, and create the first routing path or the second routing path based on the received location identification information and virtual topology information.

The VNF router may receive link layer discovery protocol (LLDP) information from one or more switches under control of the first SDN controller and from one or more switches under control of the second SDN controller and creates the virtual topology information for each virtual network. Also, the first SDN controller and the second SDN controller may establish a routing path from an edge switch connected to the source terminal to the destination cross switch based on the virtual topology information and the packet routing information. The first SDN controller may transmit the packet from the source terminal to the destination cross switch by transmitting flow table entries to one or more switches on the first routing path. The second SDN controller may transmit, from the destination cross switch, a packet which has been received from a virtual tenant network controlled by the first SDN controller to the destination terminal by transmitting flow table entries to one or more switches on the second routing path.

The first SDN controller and the second SDN controller may monitor a state of a virtual network under control thereof and create the first routing path and the second routing path, respectively, by taking into account an available bandwidth of link. Also, the first SDN controller and the second SDN controller may be independent of each other so as not to affect performances of the different virtual networks.

In another general aspect, there is provided a method for distributed multi-domain routing control in different virtual tenant networks formed as SDN networks, the method including: exchanging network information between the different virtual tenant networks; requesting a virtual tenant network for which a received packet is destined to send packet routing information; establishing a second routing path from a cross switch to a destination terminal of the received packet, the cross switch connecting a virtual tenant network that has received the packet and the virtual tenant network for which the packet is destined; transmitting, to the virtual tenant network that has received the packet, location identification information of the destination terminal that contains an SDN controller identifier and a network identifier; and creating a first routing path from a source terminal of the packet to the cross switch based on the received location identification information and virtual topology information.

The method may further include, in response to a determination that the received packet is destined for the same virtual tenant network that has received the packet, setting up a routing path based on a virtual topology; and transmitting the received packet based on the set routing path. The method may further include creating virtual topology information about each virtual network by receiving LLDP information from one or more switches under control of each of the virtual tenant networks. In addition, the method may further include: transmitting flow table entries to one or more switches on the created first routing path; and transmitting the received packet from the source terminal to the destination cross switch based on the flow table entries.

Other features and aspects will be apparent from the following detailed description, the drawings, and the claims.

BRIEF DESCRIPTION OF THE DRAWINGS

FIG. 5 is a flowchart illustrating a virtual network-based distributed multi-domain routing control method according to an exemplary embodiment.

Figure 1:
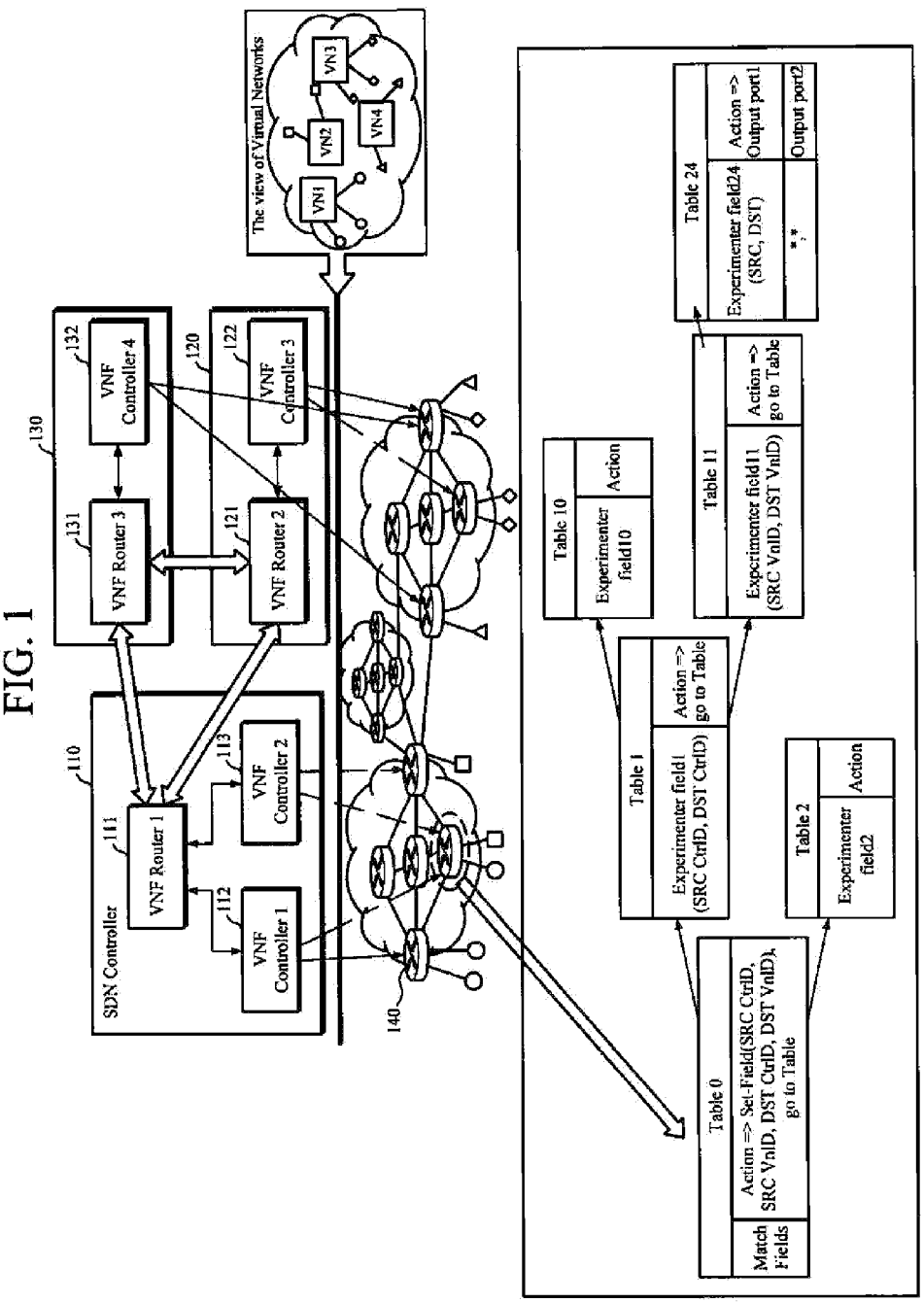
FIG. 1 is a diagram illustrating a virtual network-based distributed multi-domain routing control system according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

A virtual network-based distributed multi-domain routing control system according to the present disclosure performs distributed control for routing in a virtual network configured as a software defined network (SDN). One SDN controller manages at least one virtual tenant network. The SDN controller may include one virtual network flow router (hereinafter, referred to as a "VNF router") and at least one virtual network flow controller (hereinafter, referred to as a "VNF controller").

FIG. 1 is a diagram illustrating a virtual network-based distributed multi-domain routing control system according to an exemplary embodiment.

Referring to FIG. 1, the virtual network-based distributed multi-domain routing control system includes VNF controllers 112, 113, 122, and 132 that provide control over associated virtual networks and VNF routers 111, 121, and 131. The VNF controllers 112, 113, 122, and 132 control physical switches 140 on routing paths in order to ensure traffic flow over one or more virtual tenant networks provided on a single physical infrastructure network. The VNF routers 111, 121, and 131 provides virtual network-based topology management and routing in order to ensure traffic flow over virtual networks in the same domain and traffic flow over virtual networks belonging to different domains. In the example illustrated in FIG. 1, the numbers of virtual networks and SDN controllers 110, 120, and 130 that correspond to the virtual networks are arbitrarily specified for convenience of explanation, and any number of virtual networks and SDN controllers may be provided.

In a large-scale network environment where the VNF controllers 112 and 113 provide control over associated virtual networks, the virtual network-based distributed multi-domain routing control system provides optimized routing paths for efficient routing between domains without affecting service traffics in other virtual networks, through the VNF routers 111, 121, and 131 that provide information on routing paths for routing a received flow packet to a destination terminal.

In a general large-scale network infrastructure, only the routing control for network domains existing within a control range is possible, and hence only a simple flooding mechanism can be used for the routing between the network domains. However, an application of the flooding mechanism to the routing of a received packet between the network domains may not be efficient because neighboring switches of a specific switch that sends the received packet, as well as the specific switch, repeatedly apply the flooding mechanism until the received packet is dropped or arrives at a destination terminal. In such a configuration, for multiple VNF controllers to logically perform centralized control, all VNF controllers need to share the same information regarding the entire network with each other. The sharing of the network information between the VNF controllers may be done by issuing requests for sharing network information and then exchanging response messages.

In order to support an efficient network domain routing function, the virtual network-based distributed multi-domain routing control system obtains location identification information through protocol (PacketRoute_request and PacketRoute_Reply) interfaces among two or more VNF routers 111, 121, and 131, wherein the location identification information contains controller IDs of the SDN controllers 110, 120, and 130 in the virtual network, to which a destination terminal of the packet received is connected and an ID (VN ID) of said virtual network. Based on the obtained location identification information, the routing system routes the operating service flow between the network domains. The amount of packet traffic during the routing may be reduced by the effective network domain routing function using the VNF routers 111, 121, and 131, and faster routing can be achieved by the above architecture that distributes the control of large scale network resources to virtual networks.

In order to distribute the load of control traffic in a large-scale network environment, the routing system of the present disclosure has a distributed control structure in which a plurality of VNF controllers 112 and 113 that provide control over their associated virtual networks interact with VNF routers 111, 121, and 131. Based on the above structure, the VNF routers distinguish control traffic as flow within the virtual network, flow between virtual networks, or multi-domain flow; said distinguished flows are then made known to the control switches, so that the multiple virtual networks can co-exist without affecting the traffic flows of others.

When the VNF controllers 112 and 113 control the switches to recognize the control traffic which is distinguished as flow within the virtual network, flow between virtual networks, or multi-domain flow, the switches create a flow table in a tree-like structure and perform a pipelining function to classify received flows based on internal and external communications of each network. The routing paths of the classified flows are re-calculated by periodically measuring the states of corresponding links and factoring in the measured link states into its calculations. For example, if packets to be transferred are destined for different virtual networks, rather than to the same network, each of the VNF controllers 112 and 113 belonging to the different virtual networks creates a routing path only for the corresponding virtual network. That is, the VNF controllers 112 and 113 each sets up a routing path, only in their relevant virtual network, to the destination cross switch that connects the two virtual networks.

Figure 2:
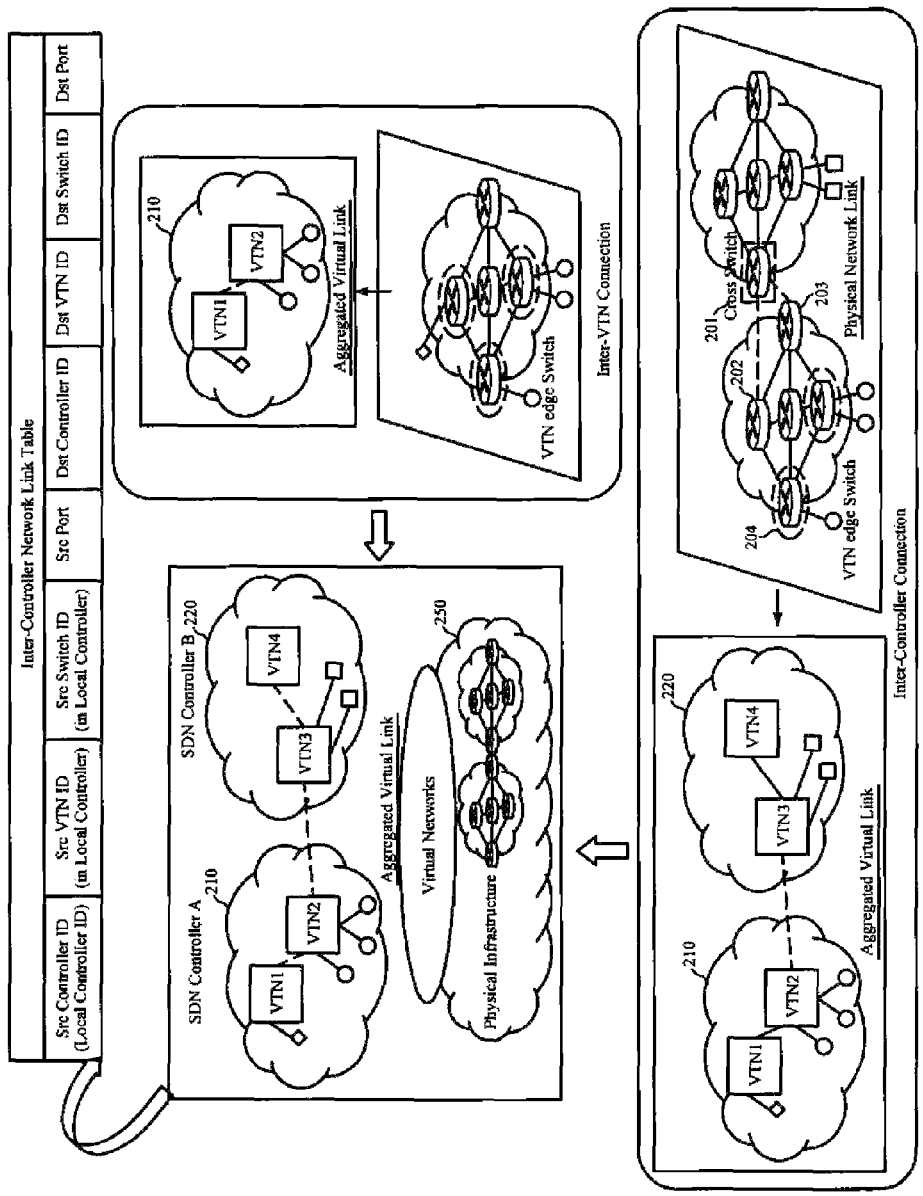
FIG. 2 is a diagram for explaining the generation and management of a virtual topology by the virtual network-based distributed multi-domain routing control system according to an exemplary embodiment.

FIG. 2 is a diagram for explaining the generation and management of a virtual topology by the virtual network-based distributed multi-domain routing control system according to an exemplary embodiment.

Referring to FIG. 2, network virtualization is a technology to introduce an abstract layer between a user and physical resources, which constitute a network infrastructure, allowing only logical resources, not the physical characteristics of the resources, to appear to application services or the user. The system suggested in the present disclosure enables networks which are virtualized based on the combination of at least one VNF controller providing control over an associated virtual network, at least one VNF router, and at least one virtual link, to share physical links therebetween in an access network, and thereby to be divided by various virtual topologies. Accordingly, a plurality of network architectures and services can be simultaneously operated on the same infrastructure, and through the virtualization, users can use the shared resources without interfering with each other and the complexity of the infrastructure can be advantageously reduced.

In order to enable networks for different services with various requirements to co-exist in the network infrastructure through not only the transmission paths but also the virtualization of all resources in the networks, including network nodes, the routing control system according to the exemplary embodiment creates physically different pieces of hardware into the virtual devices of the same common form or creates a number of virtual devices in the same physical hardware, thereby providing a management function for virtual topology information based on a virtual network in which the complexity of physical infrastructure is abstractly simplified.

According to the virtual network-based distributed multi-domain routing control system, in a large-scale network environment that is controlled by a plurality of SDN controllers 210 and 220, each of SDN controllers 210 and 220 obtains information about the state of connection of a switch under the control of the other SDN controllers 210 or 220 to a destination cross switch 201, based on link layer discovery protocol (LLDP) packet information about a source switch ID, a source outgoing port, a destination switch ID, a destination incoming port which is received from the said local switch. Also, through the state information about the connection between local switches 202 and 203, which are connected to the destination cross switch 201, and an edge switch of a virtual tenant network, each of the SDN controllers 210 and 220 identifies the state of connection between a virtual tenant network and a local virtual tenant network which are under the control of the other SDN controller 210 or 220. By doing so, the VNF controller and the VNF router manage the states of virtual links, as well as generate and manage virtual topologies based on the virtual link information and created virtual tenant network information.

In a large-scale network infrastructure environment, a request for an optimization path for the packet is issued to the SDN controller when a received packet that cannot be processed with the flow table information, and in response to said issuance, each SDN controller adds a routing entry to allow the selection of a packet route by transferring a result of executing a routing algorithm for each flow to all switches on a path along which the packet is sent. Also, the SDN controller adds a flow routing entry with respect to an inverse route of said packet.

In the virtual network environment, the independency and isolation between different virtual networks have to be ensured so that, in the event, of congestion in one network, influence of transmitted traffic on the performance of other virtual networks can be prevented. For this reason, a state of a link corresponding to a created routing path is periodically measured, then a routing path is re-calculated and updated by factoring in the measured link states into its calculations, and the switches corresponding to the updated routing path are regularly updated to the flow table, so that the traffic quality of each flow is ensured. During the monitoring of the network states, LLDP packets are sent to each switch port to obtain network topology information, and all kinds of state information about each port, such as annalistic port data of each switch (e.g., the numbers of packets and bytes of each port), is obtained to identify the states of the networks. By taking into account the available bandwidth of the link measured based on the network states a routing path that dynamically factors in the changes in the link which connects the switches is generated. In the course of generating the routing path, in order to ease a bottleneck by distributing traffic that is concentrated in one path to other available paths, the flows are classified according to purposes and types of services to enable efficient usage of unused links, and then routing for each flow is performed. The topology information about available network resources is obtained by retaining the network resources that satisfy constraints, such as a minimum available bandwidth, an end-to-end latency, the maximum number of transmittable links, while removing the other unsatisfying network resources, and a shortest path algorithm is executed to find an optimal routing path.

Figure 3:
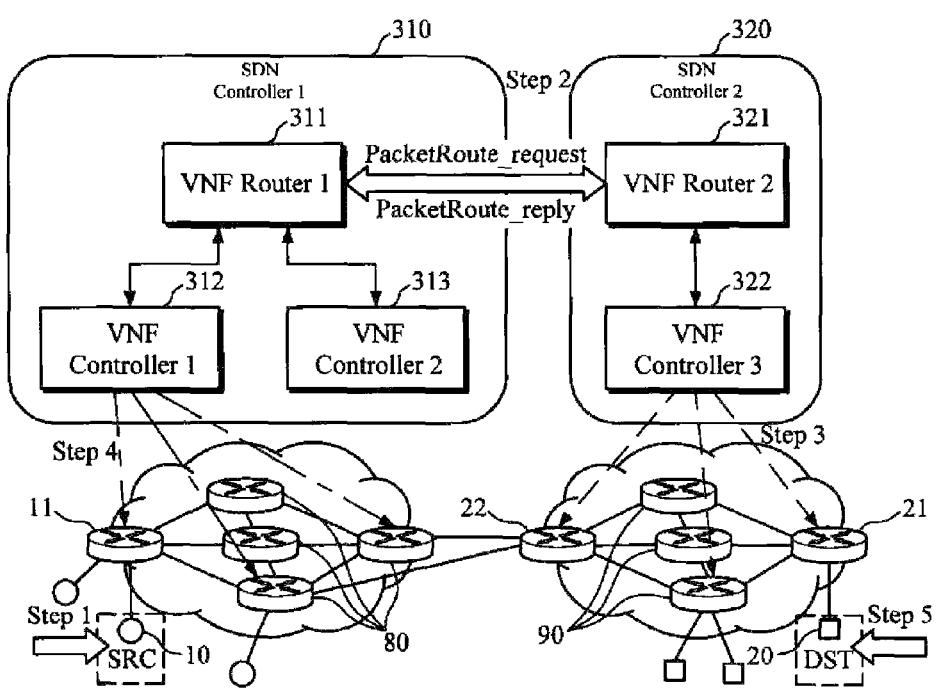
FIG. 3 is a diagram illustrating in detail the virtual network-based distributed multi-domain routing control system according to the exemplary embodiment.

FIG. 3 is a diagram illustrating in detail the virtual network-based distributed multi-domain routing control system according to the exemplary embodiment.

Referring to FIG. 3, the virtual network-based distributed multi-domain routing control system controls domain routing among two or more virtual tenant networks, using virtual network-based virtual topology information that is shared by two or more VNF controllers 312, 313, and 322, as well as VNF routers 311 and 321. For convenience of description, the exemplary embodiment illustrated in FIG. 3 assumes that there are three virtual tenant networks that include VNF controllers 1, 2, and 3 312, 312, and 313. The numbers of virtual tenant networks and the VNF controllers are provided only as an exemplary embodiment for a more effective description of the present disclosure, and aspects of the disclosure are not limited thereto, such that the numbers of the virtual tenant networks and VNF controllers may vary according to types or purposes of networks.

TABLE 1

Virtual network-based distributed routing control procedures in a multi-domain environment

| | |
|---|---|
| Step 1 | PacketIn(Switch->Controller):<br>Information request of PacketIn DST(VNF Controller1->VNF Router1) |
| Step 2 | PacketRoute_request(VNF Router1->VNF Router2):<br>information request of DST(VNF Router2->VNF Controller3) |
| Step 3 | Creation of flow table entries(VNF Controller3->Switches):<br>PacketRoute_reply(VNF Router2->VNF Router1) |
| Step 4 | Creation of flow table entries(VNF Controller1->Switches):<br>PacketOut(VNF Controller1->Switch) |
| Step 5 | Packet Receiving(SRC->DST) |

Table 1 shows virtual network-based distributed routing control procedures in a multi-domain environment. The routing control procedures from Step 1 to Step 5 as shown in Table 1 describe Step 1 to Step 5 shown in FIG. 3. In the virtual network-based distributed multi-domain routing control system of FIG. 3, a controller ID and a VN ID of a destination device in a different domain are informed through exchanged request and response messages (PacketRoute-request/PacketRoute-reply). At this time, the VNF controllers 312 and 322 in different domains, which control switches 11, 22 and 21 that connect a source terminal 10 and a destination terminal 20, each determines an optimal routing path from the corresponding VTN edge switch 11 and 21 to the destination cross switch 22, and sends routing entry information to their corresponding switches, thereby enabling packet routing between domains.

Once the routing paths between domains have been determined, a transmission path from the source terminal 10 and the destination terminal 20 is known, and hence, even when different application service traffic between the same source terminal 10 and the same destination terminal 20 occurs, it is possible to reduce a packet routing processing time. The present disclosure suggests a system that can establish a scalable SDN network in a large-scale network infrastructure environment by distributing routing control traffic while allowing the VNF controllers 312, 313, and 322 and the VNF routers 311 and 411 to share topology information across multiple domains. In this case, the system uses a distributed control structure, in which the VNF controllers 312, 313, and 322 that provide control over their associated virtual networks interact with the VNF routers 311 and 411 that provide information about the destination terminal 20.

SDN controller 1 310 obtains information about the connection state between a destination cross switch and each local switch through link layer discovery protocol (LLDP) packet information, which is received from at least one switch under the control of SDN controller 1 310.

Based on the connection state of each switch identified from the received LLDP information, VNF router 1 311 creates virtual link state information and virtual topology information for one virtual tenant network, hereinafter referred to as 'virtual tenant network A'. VNF router 2 321 also creates virtual topology information for another virtual tenant network, hereinafter referred to as 'virtual tenant network B'. Then, VNF router 1 311 and VNF router 2 321 may exchange the created logical topology information each other.

When the source edge switch 11 issues a request for a transmission path for the packet received from the source terminal 10, SDN controller 1 310 requests VNF controller 1 312 of a virtual network connected to the source terminal 10 to control the routing of said packet. VNF controller 1 312 checks whether or not the received packet is destined for the same network as the source edge switch 11 that has received said packet. The routing control method varies depending on whether the destination of the received packet is in the same network as the source edge switch 11. If the destination of the received packet is in the same network as the source edge switch 11, VNF controller 1 312 creates a routing path for transmitting the packet to the destination based on virtual topology information. Also, VNF controller 1 312 transmits flow table entries to the switches on the created routing path, thereby being able to transmit the packet received from the source terminal 10 to the destination.

If the received packet is destined for a different virtual network, VNF controller 1 312 requests VNF router 1 311 to send location identification information (a controller ID and a VN ID) of the destination terminal 20, which contains an identifier of SDN controller 2 320 that controls the virtual network to which the destination terminal 20 belongs. In response to the request for the identification information from VNF controller 1 312, VNF router 1 311 requests, based on virtual topology information about the virtual tenant network, the VNF controller 2 313 or VNF router 2 for said identification information.

Based on information received via the protocol between the VNF routers 311 and 321 about target switches to be controlled by each SDN controller 310 and 320, it is determined that an edge switch connected to the destination terminal 20 is under the control of SDN controller 2 320, VNF controller 1 312 transmits a packet routing information request message (PacketRoute_request) to VNF router 2 321 in order to request the identification information. In response to the packet routing information request message, VNF router 1 311 receives a packet routing information response message (PacketRoute_reply) from VNF router 2 321, the packet routing information response message (Packet-Route_reply) containing identification information and information about the destination cross switch 22, and the virtual network to which the destination terminal belongs. Then, VNF router 1 311 sends the received packet routing information response message (PacketRoute_reply) to VNF controller 1 312.

Based on the received identification information and information about the destination cross switch 22, along with the virtual topology created by VNF router 1 311, VNF controller 1 312 creates a routing path, hereinafter referred to as 'routing path A', from the source edge switch 11, which is connected to the source terminal 10 that has sent the packet, to the destination cross switch 22. VNF controller 1 312 transmits, to one or more switches 80 on the created routing path A, flow table entries that include the routing path A. Once the flow table entries have been transmitted to the switches on the routing path A, the packet received from the source terminal 10 is transmitted from the source edge switch 11 to the destination cross switch 22 based on the flow table entries.

In response to receiving the packet routing information request message from VNF router 1 311, VNF router 2 321 requests VNF controller 3 322 to send location identification information (a controller ID and a VN ID) of the destination terminal 20 belonging to the virtual network that is under the control of SDN controller 2 320.

In response to receiving the identification information request from VNF router 2 321, VNF controller 3 322 checks the destination edge switch 21 to which the destination terminal 20 is connected and the destination cross switch 22. In addition, VNF controller 3 322 creates a routing path B, hereinafter referred to as 'routing path B', from the destination cross switch 22 to the destination edge switch 21 using virtual topology information. Also, VNF controller 3 322 transmits flow table entry information that contains information about the routing path B to one or more switches 90 thereon. When the packet is transmitted to the destination cross switch 22 by the switches on the routing path A, said packet is transmitted from the destination cross switch 22 to the destination edge switch 21 based on the flow table entries of the switches on the routing path B.

Then, VNF controller 3 322 transmits, to VNF router 2 211, information about the destination cross switch 22 and a request for location identification information (controller ID and VN ID) of the destination terminal 20. VNF router 2 321 transmits a packet routing information response message, which contains the information about the destination cross switch 22 and the identification information, to VNF router 1 311.

SDN controller 1 310 and SDN controller 2 320 creates the routing path A and the routing path B, respectively, based on the virtual topologies created for virtual networks that are under the control of SDN controllers 310 and 320. To create the routing paths, SDN controller 1 310 and SDN controller 320 first monitor the state of virtual tenant networks, transmit a LLDP packet to each switch port to obtain network topology information, and identify the network state by obtaining all types of switch state information, such as analytical port data of each switch (e.g., the numbers of packets and bytes of each port). Then, SDN controller 1 310 and SDN controller 2 320 create virtual topology information based on the obtained information and exchange the created topology information with each other. SDN controller 1 310 and SDN controller 2 320 create the routing paths that dynamically factors in changes in the link that connects the switches by taking into account an available bandwidth of the link measured based on the topology information.

In the course of creating the routing paths, in order to resolve the bottleneck phenomenon by distributing traffic that is concentrated in one path to other available paths, the flows are classified according to purpose and types of services, so as to enable efficient usage of unused links, and then routing for each flow is performed. The topology information about available network resources is obtained by retaining the network resources that satisfy constraints, such as a minimum available bandwidth, an end-to-end latency, or the maximum number of transmittable links, while removing any other unsatisfying network resources; a shortest path algorithm is then executed to find an optimal routing path. In the virtual network environment, the independency and isolation between different virtual networks have to be ensured so that, in the event of congestion in one network, influence of transmitted traffic on the performance of other virtual networks can be prevented.

Therefore, SDN controller 1 310 periodically measures the state of a link corresponding to the created routing path, re-calculates and updates a routing path by factoring in the measured link states into its calculations, and periodically updates the flow table of the switches based on the updated routing path, thereby ensuring the traffic quality of the flow. SDN controller 2 320 also creates the routing path B in the same manner as the SDN controller 1 310 does.

In the exemplary embodiment shown in FIG. 3, SDN controller 1 310 includes VNF controller 1 312 and VNF controller 2 313. VNF controller 2 313 controls the switches in the network in cooperation with VNF controller 1 312. As described above, the routing path is created and packet routing is performed based on each virtual network, so that an application of an excessive load to any one control device can be prevented and the independency and isolation between different virtual networks can be ensured, thereby preventing traffic in one network from affecting the performance of other virtual networks.

Figure 4:
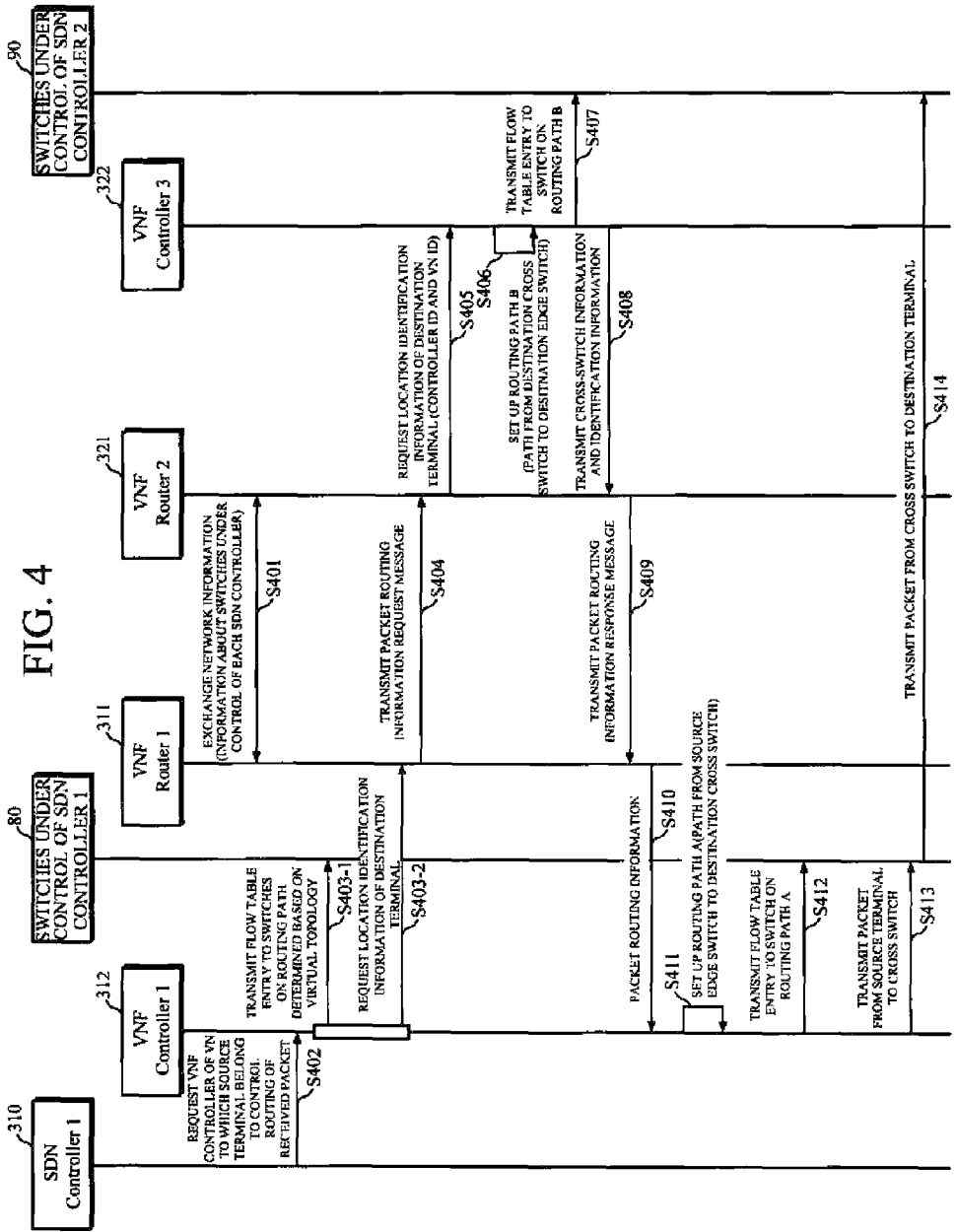
FIG. 4 is a flowchart illustrating a routing process of a virtual network-based distributed multi-domain routing control system according to an exemplary embodiment.

FIG. 4 is a flowchart illustrating a routing process of a virtual network-based distributed multi-domain routing control system according to an exemplary embodiment.

Referring to FIGS. 3 and 4 in conjunction with Table 1 above, VNF router 1 311 and VNF router 2 321 exchange with each other network information about the switches 80 and 90 which are under the control of SDN controller 1 310 and SDN controller 2 320, respectively, as depicted in S401. VNF router 1 311 receives LLDP information from one or more switches under the control of SDN controller 1 310. Through the received LLDP information, the connection states of the switches that include the edge switches 11 and 21 and the cross switch 22 can be identified.

Based on the identified connection states of the switches, VNF router 1 311 creates virtual link state information and virtual topology information about the network under the control of SDN controller 1 310. Also, VNF router 1 311 transmits network information containing the created virtual link state information and virtual topology information to VNF router 2 321. VNF router 2 321 also creates network information in the same manner as VNF router 1 311 and transmits the created network information to VNF router 1 311. Through the above procedures, VNF routers are able to exchange with each other the information about the switches under the control of the respective SDN controllers 310 and 320.

Then, in S402, in response to a request from the source edge switch 11 for a transmission path for a packet sent from the source terminal 10, VNF controller 1 312 requests the VNF controller 1 312 of one virtual network (virtual tenant network A), to which the source terminal 10 belongs, to control routing of the received packet.

VNF controller 1 312 may determine, based on the network information exchanged between the VNF routers 1 and 2, whether the received packet is destined for the same network as the switch that has received said packet. If the received packet is destined for the same network, a routing path from the source edge switch 11 to the destination edge switch 21 connected to the destination terminal 20 is established based on the virtual topology information contained in VNF controller 1 312, and VNF controller 1 312 transmits flow table entry information about the routing path to one or more switches 80 on the routing path, as depicted in S403-1. The packet received from the source terminal 10 is transmitted to the destination terminal 20 through the destination edge switch 21, passing through the switches on the established routing path, based on the flow table entries.

If it is determined in S402 that the received packet is not destined for the same network as the switch that has received said packet, VNF controller 1 312 requests VNF router 1 311 to send location identification information of the destination terminal 20, as depicted in S403-2, wherein the location identification information contains an SDN controller identifier and a network identifier (VN ID) of another virtual network (virtual tenant network B) to which the destination terminal 20 is connected.

In response to the request for the location identification information of the destination terminal 20 from VNF controller 1 312, VNF router 1 311 transmits a packet routing information request message (PacketRoute_request) to VNF router 2 321 based on the virtual topology information about the virtual tenant network, as depicted in S404, thereby requesting the identification information that contains an identifier of the virtual tenant network B and an identifier of SDN controller 2 320. If the destination of the packet is in a different virtual network domain from that of the source terminal, the state of the virtual network to which the destination terminal 20 is being connected needs to be identified so as to transmit the packet to the destination.

If it is determined that, based on the information transmitted via the protocol between the VNF routers 311 and 321 about the switches 80 and 90 that are under the control of the SDN controllers 310 and 320, the edge switch 21 to which the destination terminal 20 is connected is under the control of SDN controller 2 320, VNF router 1 311 transmits the packet routing information request message (PacketRoute_request) to VNF router 2 321 of the virtual tenant network B (which is a destination network) that is under the control of SDN controller 2 320, wherein the packet routing information request message contains the network identifier and the identifier of SDN controller 2 320. Also, VNF router 2 321 requests VNF controller 3 322 to send location identification information (controller ID and VN ID) of the destination terminal 20 belonging to a virtual network that SDN controller 2 320 controls, as depicted in S405.

In response to the request for the information about the virtual network identifier of the destination and the identifier of the SDN controller 2 320 from VNF router 2 321, VNF controller 3 322 establishes a routing path B from the destination cross switch 22, which is connected to SDN controller 1 110, to the destination edge switch 21, based on the virtual topology information, as depicted in S406. Then, VNF controller 3 322 transmits flow table entry information to one or more switches on the routing path B, as depicted in S407.

Thereafter, VNF controller 3 322 transmits the information about the destination cross switch 22 and the location identification information (controller ID and VN ID) of the destination terminal 20 to VNF router 2 321, as depicted in S408. In the course of establishing the routing path, VNF router 2 321 and VNF controller 3 322 do not establish the entire routing path, but rather, one that only connects from the destination cross switch 22 to the destination edge switch 21.

Thereafter, VNF router 2 321 transmits a packet routing information response message (PacketRoute_reply) to VNF router 1 311, as depicted in S409, wherein the packet routing information response message contains information about the cross switch 22 and the virtual network to which the destination terminal 20 belongs, as well as identification information of the virtual tenant network, which is a destination, and SDN controller 2 320. If the destination of the packet received from the source terminal 10 exists in the virtual tenant network B, VNF controller 3 322 collects information about the cross switch 22 connecting virtual tenant network A and virtual tenant network B, as well as the identifier of virtual tenant network B and the identifier information of SDN controller 2 320, and transmits the collected information by sending the packet routing information response message (PacketRoute_reply) to VNF router 1 311. VNF router 1 311, accordingly, receives the packet routing information response message from VNF router 2 321.

VNF router 1 311 transmits the received information about the cross switch 22 and identifier information to VNF controller 1 312, as depicted in S410. VNF router 1 311 that has received the packet routing information response message from VNF router 2 321 obtains the information about the cross switch 22 and the identifiers of the virtual tenant network B and SDN controller 2 320 from the packet routing information response message and transmits them to VNF controller 1 312.

Based on the information about the destination cross switch 22, identifier information of the virtual tenant network B and SDN controller 2 320, and the virtual topology information, VNF controller 1 312 creates routing path A from the source edge switch 11 to the destination cross switch 22, as depicted in S411. In the course of transmitting the packet, which has been sent from the source terminal 10 to the source edge switch 11, to the destination terminal 20, VNF controller 1 312 does not establish the entire routing path, but establishes a routing path only from the source edge switch 11 to the destination cross switch 22. VNF controller 1 312 transmits flow table entries that include the routing path A to one or more switches 50 thereon, as depicted in S412.

The switches on the routing path A transmit said packet to the destination cross switch 22 along the routing path A using the received flow table entries, as depicted in S413. Also, the switches on the routing path B, which have received the flow table entries from VNF controller 3 322, transmit the received packet from the destination cross switch 22 to the destination terminal 20 through the destination edge switch 21, based on the flow table entries, as depicted in S414.

FIG. 5 is a flowchart illustrating a virtual network-based distributed multi-domain routing control method according to an exemplary embodiment.

Referring to FIG. 5, the method for controlling multi-domain routing between two different networks which include SDN controller 1 and SDN controller 2, entails the VNF routers exchange with each other information about switches that are under the control of SDN controller 1 and SDN controller 2, as depicted in S501. SDN controller 1 controls and manages a virtual network (virtual tenant network A) to which a source terminal is connected; and SDN controller 2 controls and manages another virtual network (virtual tenant network B) to which a destination terminal is connected.

SDN controller 1 receives LLDP information from one or more switches under the control of SDN controller 1 in the virtual network (the virtual tenant network A) that includes SDN controller 1. The connection state between the edge switch and the cross switch can be identified through the LLDP information received from the switches. SDN controller 1 creates virtual link state information and virtual topology information based on the identified connection state of the switches. Then, SDN controller 1 transmits network information that contains the created virtual link state information and virtual topology information to SDN controller 2. SDN controller 2 also creates network information in the same manner as SDN controller 1 and transmits it to SDN controller 1. Through the above procedures, the SDN controllers can exchange with each other information about the switches that each SDN controller controls.

Then, when receiving a packet from the source edge switch connected to the source terminal, SDN controller 1 identifies a virtual network to which a destination terminal is connected, as depicted in S502, and determines whether the received packet is destined for the same network as the destination terminal, as depicted in S503. VNF controller 1 may determine, based on the switch information contained in the exchanged network information, whether the received packet is destined for the same network as the destination terminal.

In response to the determination in S503 that the received packet is destined for the same virtual network, SDN controller 1 establishes a routing path from the source edge switch to a destination edge switch connected to the destination terminal, as depicted in S504. Thereafter, SDN controller 1 transmits flow table entry information to one or more switches on the established routing path, as depicted in S505, and then transmits the received packet to the destination terminal through the switches on the routing path based on the flow table entries, as depicted in S506.

In response to a determination in S503 that the received packet is destined for a different virtual network from the source terminal, SDN controller 1 requests SDN controller 2 to send packet routing information that contains location identification information of the destination terminal, as depicted in S507. If the destination is in a different virtual network domain, a state of the virtual network (virtual tenant network B) to which the destination terminal is connected needs to be identified in order to transmit the packet to the destination terminal. Based on the information about the switches controlled by each SDN controller, which is received via a protocol between the SDN controllers, if it is determined that the edge switch connected to the destination terminal is under the control of SDN controller 2, SDN controller 1 transmits, to SDN controller 2, a packet routing information request message (PacketRoute_request) that contains the identification information of the destination terminal including a network ID (VN ID) and a SDN controller ID.

In response to the packet routing information request from SDN controller 1, SDN controller 2 establishes, based on the virtual topology information, as depicted in S508, another routing path (routing path B) that connects the cross switch that connects the different two virtual networks and the.

Here, the cross switch is what connects the two different virtual networks, which the destination edge switch is what is connected to the destination terminal of the packet. Then, SDN controller 2 transmits flow table entry information that contains information about this routing path B to one or more switches thereon, as depicted in S509.

Then, SUN controller 2 transmits a packet routing information response message (PacketRoute-reply) to SDN controller 1, as depicted in S510.

Based on the received packet routing information, SDN controller 1 creates routing path A from the source edge switch connected to the source terminal of the packet to the cross switch, as depicted in S511. When the packet from the source terminal arrives at the source edge switch and is transmitted from the source edge switch to the destination switch, SDN controller 1 does not create the entire routing path from the source terminal to the destination switch, but only creates the routing path from the source edge switch to the cross switch. Then, SDN controller 1 transmits flow table entries that include the routing path A to one or more switches thereon, as depicted in S512.

Once the two routing paths have been established and the flow table entries have been transmitted to the switches on said routing paths, the packet requested to be transferred by the source terminal is transmitted from the source edge switch to the cross switch, based on the flow table entries of the switches on the routing path A established by SDN controller, as depicted in S513. Then, said packet is transmitted from the cross switch to the destination edge switch based on the flow table entries of the switches on the routing path B established by SDN controller 2, as depicted in S514.

In the above method for virtual network-based distributed multi-domain routing control, the information (controller ID and VN ID) on a destination device in a different domain is revealed via request and response messages (PacketRoute-request/PacketRoute-reply) exchanged between VNF routers, and during this time, SDN controllers in different domains that control switches connected to a source terminal and a destination terminal determines optimal routing paths from edge switches connected to each terminal to a cross switch and transmit routing entry information to their corresponding switches, thereby enabling packet routing between domains. Once the routing paths between domains have been determined, a transmission path from the source terminal and the destination terminal is known, and hence, even when different application service traffic between the same source terminal and the same destination terminal occurs, it is possible to reduce a packet routing processing time. As described above, the present disclosure suggests a method that can establish a scalable SDN network in a large-scale network infrastructure environment by distributing routing control traffic while allowing the VNF controllers and the VNF routers to share topology information across multiple domains. The method uses a distributed control structure, in which the VNF controllers that provide control over their associated virtual networks interact with the VNF routers that provide information about the destination terminal.

a method for establishing a scalable SDN network in a large-scale network infrastructure environment, using a distributed control structure in which the VNF controllers to provide control over their associated virtual networks interact with the VNF routers that provide information about the destination terminal, topology information is shared between multiple domains and routing control traffic is distributed.

In the system and method for virtual network-based distributed multi-domain routing control according to the above exemplary embodiments, virtual network flow controllers that provide control over their associated virtual networks are arranged in a scattered manner, so that load from control traffic of switches can be distributed and reduced. In addition, because routing among the distributed VNF controllers in multiple domains is performed based on virtual topology information shared via protocols exchanged between the VNF routers, latency in routing processing for flow in VNF controllers and flows between the VNF controllers can be reduced.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for distributed multi-domain routing control in different virtual tenant networks formed as software-defined networks (SDN), the system comprising:
one or more computer-executable virtual controllers and routers being configured and executed by a processor using algorithm associated with at least one non-transitory storage device, the algorithm, when executed, causing the processor to execute the one or more virtual controllers and routers, the system comprising:
a first SDN controller configured to create virtual topology information by collecting information about switches, and to create a first routing path, the first routing path corresponding a path from a source terminal that has sent a packet to a destination cross switch of a virtual tenant network to which a destination terminal of the packet is connected, the first path being created based on received location identification information of the destination terminal and the created virtual topology information;
a second SDN controller configured to create virtual topology information by collecting information about switches, and
in response to receipt of a request, the request corresponding to a virtual tenant network to which the destination terminal is connected, from the first SDN controller, the second SDN controller configured to transmit the location identification information and to create a second routing path, the second routing path corresponding to a path from the destination cross switch to the destination terminal, the second path being created based on the created virtual topology information; and
a virtual router configured to identify a virtual tenant network to which the destination terminal of the received packet is connected and configured to manage communications between the different virtual tenant networks or between each of the virtual tenant networks and an external network by exchanging network information about the different virtual tenant networks,
wherein each of the first SDN controller and the second SDN controller comprises:
a virtual network flow (VNF) router configured to exchange network information about the different virtual tenant network, identify, based on the exchanged network information, a virtual tenant network to which the destination terminal of the received packet is connected, and manage a communication within the virtual tenant network, and
a VNF controller configured to request the virtual tenant network to which the destination terminal is connected to send packet routing information that contains the location identification information of the destination terminal, reply to the packet routing information request by sending the location, identification information of the destination terminal, and create the first routing path or the second routing path based on the received location identification information and virtual topology information,
wherein the VNF router receives link layer discovery protocol (LLDP) information from one or more switches under control of the first SDN controller and from one or more switches under control of the second SDN controller and creates the virtual topology information for each virtual network, and
wherein the VNF controller of the second SDN controller transmits, from the destination cross switch, a packet which has been received from a virtual tenant network controlled by the first SDN controller to the destination terminal by transmitting flow table entries to one or more switches on the second routing path.

2. The system of claim 1, wherein the VNF router identifies the virtual tenant network to which the destination terminal of the received packet is connected based on switch information contained in the exchanged network information.

3. The system of claim 1, wherein the VNF controller establishes a routing path from an edge switch connected to the source terminal to the destination cross switch based on the virtual topology information and a network identifier and an SDN controller identifier which are contained in the packet routing information.

4. The system of claim 1, wherein the VNF controller distinguishes control traffic as flow within a virtual tenant network, flow between virtual tenant networks, and multi-domain flow.

5. The system of claim 1, wherein the VNF controller of the first SDN controller transmits the packet from the source terminal to the destination cross switch by transmitting flow table entries to one or more switches on the first routing path.

6. The system of claim 1, wherein the first SDN controller and the second SDN controller monitor a state of a virtual network under control thereof and create the first routing path and the second routing path, respectively, by taking into account an available bandwidth of link.

7. The system of claim 1, wherein the first SDN controller and the second SDN controller are independent of each other so as not to affect performances of the different virtual networks.

8. The system of claim 1, wherein the virtual router manages a communication between the different virtual tenant networks or a communication between each virtual tenant network and an external network.

9. The system of claim 1, wherein in a case where the received packet is destined for the same network as a switch that has received the packet, the first SDN controller or the second SDN controller transmits the packet to a destination by transmitting flow table entries to one or more switches under control thereof based on the virtual topology information.

10. A computer implemented method for distributed multi-domain routing control of a system in different virtual tenant networks formed as SDN networks, the method comprising:
   exchanging network information between the different virtual tenant networks;
   requesting to send packet routing information which represents a virtual tenant network for which a received packet is destined creating a second routing path from a cross switch to a destination terminal of the received packet, the cross switch connecting a virtual tenant network that has received the packet and the virtual tenant network for which the packet is destined;
   in response to receipt of a request, the request corresponding to a virtual tenant network to which the destination terminal is connected, transmitting by a controller, to the virtual tenant network that has received the packet, location identification information which contains an SDN controller identifier and a network identifier of the destination terminal; and
   creating a first routing path from a source terminal of the packet to the cross switch based on the received location identification information and virtual topology information;
   transmitting flow table entries to one or more switches on the created first routing path;
   transmitting the received packet from the source terminal to the destination cross switch based on the flow table entries;
   transmitting flow table entries to one or more switches on the created second routing path;
   transmitting the received packet from the destination cross switch to the destination terminal based on the flow table entries; and
   creating virtual topology information about each virtual network by receiving LLDP information from one or more switches under control of each of the virtual tenant networks,
   wherein the system comprises:
   a first SDN controller configured to create virtual topology information by collecting information about switches, and to create a first routing path, the first routing path corresponding a path from a source terminal that has sent a packet to a destination cross switch of a virtual tenant network to which a destination terminal of the packet is connected, the first path being created based on received location identification information of the destination terminal and the created virtual topology information;
   a second SDN controller configured to create virtual topology information by collecting information about switches, and
   in response to receipt of a request, the request corresponding to a virtual tenant network to which the destination terminal is connected, from the first SDN controller, the second SDN controller configured to transmit the location identification information and to create a second routing path, the second routing path corresponding to a path from the destination cross switch to the destination terminal, the second path being created based on the created virtual topology information; and
   a virtual router configured to identify a virtual tenant network to which the destination terminal of the received packet is connected and configured to manage communications between the different virtual tenant networks or between each of the virtual tenant networks and an external network by exchanging network information about the different virtual tenant networks,
   wherein each of the first SDN controller and the second SDN controller comprises:
   a virtual network flow (VNF) router configured to exchange network information about the different virtual tenant network, identify, based on the exchanged network information, a virtual tenant network to which the destination terminal of the received packet is connected, and manage a communication within the virtual tenant network, and
   a VNF controller configured to request the virtual tenant network to which the destination terminal is connected to send packet routing information that contains the location identification information of the destination terminal, reply to the packet routing information request by sending the location, identification information of the destination terminal, and create the first routing path or the second routing path based on the received location identification information and virtual topology information,
   wherein the VNF router receives link layer discovery protocol (LLDP) information from one or more switches under control of the first SDN controller and from one or more switches under control of the second SDN controller and creates the virtual topology information for each virtual network, and
   wherein the VNF controller of the second SDN controller transmits, from the destination cross switch, a packet which has been received from a virtual tenant network controlled by the first SDN controller to the destination terminal by transmitting flow table entries to one or more switches on the second routing path.

11. The method of claim 10, further comprising determining whether the received packet is destined for the same virtual tenant network that has received the packet.

12. The method of 11, further comprising:
   in response to a determination that the received packet is destined for the same virtual tenant network that has received the packet, setting up a routing path based on a virtual topology; and transmitting the received packet based on the set routing path.

13. The method of claim 10, wherein in the creating of the first routing path, the routing path from an edge switch connected to the source terminal to the destination cross switch is set up based on the virtual topology information and location identification information of the destination terminal.

14. The method of claim 10, wherein in the creating of the first routing path and the creating of the second routing path, a state of each virtual tenant network is monitored and the first routing path and the second routing path are created by taking into account an available bandwidth of link.

* * * * *